July 25, 1967
H. J. ELDER ETAL
3,332,971
PROCESS FOR CONVERTING COBALTOUS ACETATE OR COBALTOUS
PROPIONATE TO THE COBALTOUS SALT OF 2-ETHYLHEXANOIC
ACID OR THE COBALTOUS SALT OF NAPHTHENIC ACIDS
Filed May 2, 1963
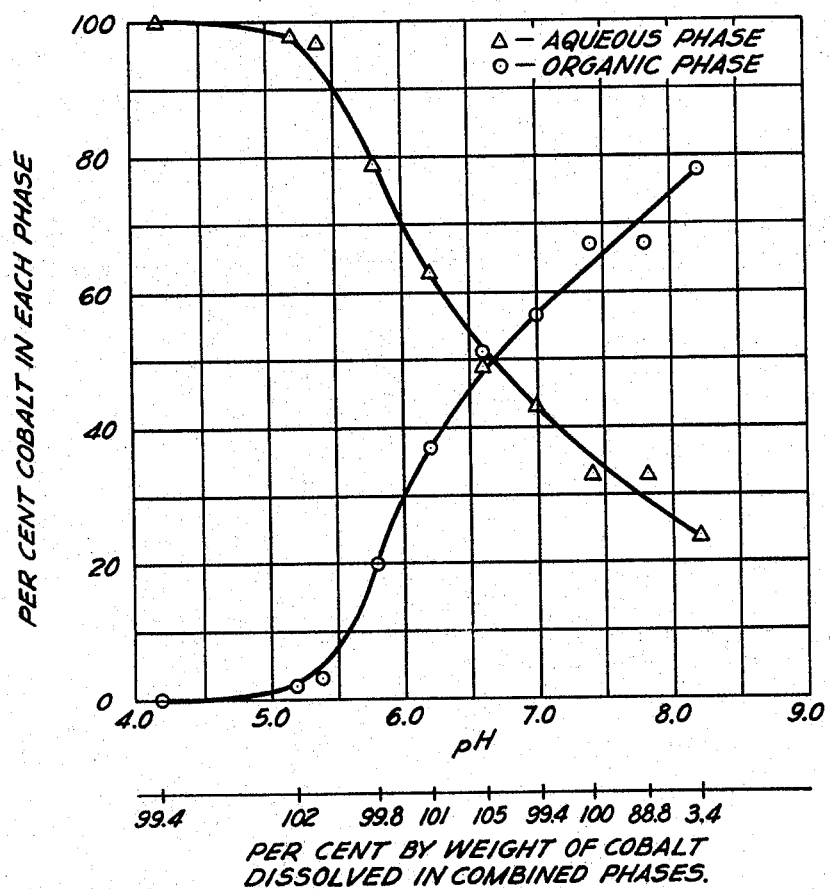
INVENTORS.
HARRY J. ELDER
BERNARD H. GWYNN
JOHN V. WARD
BY
ATTORNEY.

United States Patent Office 3,332,971
Patented July 25, 1967

3,332,971
PROCESS FOR CONVERTING COBALTOUS ACETATE OR COBALTOUS PROPIONATE TO THE COBALTOUS SALT OF 2-ETHYLHEXANOIC ACID OR THE COBALTOUS SALT OF NAPHTHENIC ACIDS
Harry J. Elder, Springdale, Bernard H. Gwynn, Gibsonia, and John V. Ward, Oakmont, Pa., assignors to Gulf Research & Development Company, Pittsburgh, Pa., a corporation of Delaware
Filed May 2, 1963, Ser. No. 277,590
9 Claims. (Cl. 260—439)

This invention relates to a process for converting a cobalt compound selected from the group consisting of cobaltous acetate and cobaltous propionate in an aqueous solution to a cobaltous salt selected from the group consisting of the cobaltous salt of 2-ethylhexanoic acid and the cobaltous salt of naphthenic acids.

In the Oxo process a mixture comprising hydrogen, carbon monoxide and an olefin is reacted at an elevated temperature and an elevated pressure in the presence of a catalytic amount of a cobalt compound to obtain a mixture predominating in an aldehyde having one more carbon atom than the reactant olefin and having dissolved therein the cobalt catalyst. After the unreacted hydrogen and carbon monoxide are removed from the aldehyde product, the latter is treated to remove therefrom the dissolved cobalt compound. The aldehyde product remaining is then treated at an elevated temperature and an elevated pressure with hydrogen in the presence of a hydrogenation catalyst, such as nickel, to convert the aldehyde to the corresponding alcohol.

A large amount of the soluble cobalt catalyst can be removed from the crude aldehyde product obtained in the first stage of the Oxo process by contacting the same with water containing at least the stoichiometric amount of acetic acid and/or propionic acid at an elevated temperature and pressure. Water soluble cobaltous acetate or cobaltous propionate are thus formed. The water layer containing the dissolved cobalt metal salt is separated from the demetalled aldehyde product in any suitable manner, and the aldehyde product can then be subjected to hydrogenation to convert the aldehyde to the corresponding alcohol. Additional soluble cobaltous acetate or cobaltous propionate can be obtained in the aqueous layer by treating the same with molecular oxygen in the presence of a selected amount of acetic or propionic acid. These procedures are illustrated and defined in application Ser. No. 230,969, of Bernard H. Gwynn, William A. Pardee and John V. Ward, filed Oct. 16, 1962, now Patent No. 3,246,024, entitled Process, which application is also assigned to the same assignee as the instant application. The pH of such aqueous solutions containing cobaltous acetate or cobaltous propionate is in the range of about 4.0 to about 5.5.

Cobaltous acetate or cobaltous propionate are not often desired as such, and especially in the Oxo process it would be extremely desirable to convert the same to the cobaltous salt of 2-ethylhexanoic acid or the cobaltous salt of naphthenic acids. This is so because the latter salts are organic soluble and are extremely effective catalysts for use in the first stage of the Oxo process. In order to obtain the latter catalysts and to facilitate the reaction leading to the same, a water-soluble alkali metal salt of 2-ethylhexanoic acid, such as the sodium or potassium salts thereof, but preferably the sodium salt, or a water-soluble alkali metal salt of naphthenic acids, such as the sodium or potassium salts thereof, but preferably the sodium salt, is added to the defined aqueous solution containing cobaltous acetate or cobaltous propionate. For a discussion as to the identity of naphthenic acids see The Chemical Technology of Petroleum, of Gruse and Stevens, pages 97–102, Second Edition, McGraw-Hill Book Company, Inc., 1942. This reaction can be conducted, for example, at a temperature of about 10° to about 132° C. and a pressure of about 0 to about 25 pounds per square inch gauge. The reaction goes swiftly and is substantially complete in a matter of about 20 to about 60 minutes. The amount of the defined alkali metal salt which is employed to react with the cobaltous acetate or cobaltous propionate is at least the stoichiometric amounts required, but in order to assure the desired reaction about 10 to about 200 percent by weight of the alkali metal salt reactant in excess of that required for the reaction is employed.

As a result of the reaction the cobaltous salt of 2-ethylhexanoic acid or of naphthenic acids are formed, and since these salts are substantially insoluble in water they will precipitate out of solution. This precipitate can be recovered from the aqueous solution by filtration or by any other convenient separation means. However, since it is desirable to recover these salts in solution, particularly if the same are to be employed as catalyst in the first stage of the Oxo process, the reaction between the cobaltous acetate or the cobaltous propionate with the alkali metal salt of 2-ethylhexanoic acid or the alkali metal salt of naphthenic acids is effected in the presence of a normally liquid paraffinic or olefinic hydrocarbon, such as hexane, heptane, octane, nonane, decane, undecane, dodecane, tridecane, tetradecane, pentadecane, hexene, heptene, octene, nonene, decene, undecene, dodecene, tridecene, tetradecene, pentadecene, hexadecene, heptadecene, or mixtures thereof in which the resulting cobaltous salts are soluble. Desirably the hydrocarbon employed for such purpose when the cobaltous salt is to be employed in the Oxo process is the olefin which is to be reacted with hydrogen and carbon monoxide in the first stage thereof.

When the reaction is effected in the presence of a hydrocarbon, as in the preferred embodiment of the invention, care must be exercised to assure the solubility of the cobaltous salt product in the hydrocarbon. Left alone the hydrocarbon phase and the aqueous phase will separate into two separate and distinct layers with the hydrocarbon layer as the top layer. Therefore when the reactant alkali metal salt is added to the system it will pass as such through the hydrocarbon layer and only when it finds itself in the aqueous layer will the desired reaction take place. The resulting cobaltous salt of 2-ethylhexanoic acid or cobaltous salt of napthenic acid, being insoluble in water, will precipitate out of solution and will therefore not find their way into the hydrocarbon layer. The only cobaltous salts that will find their way in the hydrocarbon layer will be those which are formed in the interface between the layers. Therefore to assure that the cobaltous salt of 2-ethylhexanoic acid or the cobaltous salt of naphthenic acids will dissolve in the hydrocarbon layer, the mixture containing the aqueous and hydrocarbon phases are agitated to the extent necessary to effect contact between the above-defined reactant cobaltous salts and the hydrocarbon. The amount of hydrocarbon required is that amount sufficient to solubilize the cobaltous salts formed. In general an amount of hydrocarbon equal in volume to give about a six percent cobalt solution is sufficient. The alkali metal acetate or propionate also resulting from the reaction is of course water soluble and will therefore remain in the aqueous phase.

In order to effect substantial reaction between the defined reactants, the pH of the reaction medium must be maintained between about 6.0 and about 7.5, preferably between about 6.5 and about 7.0. If the pH of the aqueous phase is below about 6.0 relatively small amount of reaction between the reactants will take place. If the pH is above about 7.5 precipitation of cobaltous hydroxide will result, and in fact by the time the pH has reached about 8.2 practically all of the cobaltous compounds present will precipitate out of solution immediately in the form of cobaltous hydroxide. Since in the preferred embodiment it is desirable to obtain the cobalt salt in the original aqueous phase in the form of the hydrocarbon-soluble cobaltous salts of 2-ethylhexanoic acid or of naphthenic acids, we prefer to maintain the pH of the system in the range of about 6.5 to about 7.0.

In order to obtain maximum production of the cobaltous salt of 2-ethylhexanoic acid or of naphthenic acids soluble in the hydrocarbon phase it is imperative that the desired reaction be conducted at a pH below that at which any appreciable amount of cobaltous hydroxide begins to form. We have found that even if the pH of the system is thereafter brought to the desired pH range the cobaltous hydroxide will with extreme difficulty over a long period of time be reconverted to cobaltous acetate for reaction with either the alkali metal salt of 2-ethylhexanoic acid or of naphthenic acids. As noted, the pH of the original aqueous solution containing dissolved cobaltous-acetate is about 4.0 to about 5.5. The addition of either the alkali metal salt of 2-ethylhexanoic acid or the alkali metal salt of naphthenic acids will raise the pH of the system slightly. Accordingly in the practice of the invention there are added to the original aqueous system at least the stoichiometric amounts, and preferably at least 10 percent by weight in excess thereof, of the desired alkali metal salt of 2-ethylhexanoic acid or the alkali metal of naphthenic acids and, if required, also sufficient additional amount of a basic reagent, such as sodium hydroxide, potassium hydroxide, sodium carbonate, etc., so that the pH of the reaction system is within the desired range of about 6.0 to about 7.5. At no time is the pH of the system permitted to rise beyond the defined range. Of course in the preferred embodiment a hydrocarbon as defined is also present in the system and the whole is maintained in continuous state of agitation to facilitate the solubility therein of the cobaltous salt of 2-ethylhexanoic acid or of the cobaltous salt of naphthenic acids.

The aqueous layer can be separated from the hydrocarbon layer by decantation or any other suitable manner. If the hydrocarbon layer contains an olefin primarily, this layer containing the dissolved cobaltous salt can be employed in the first stage of the Oxo process. In the event it is desired to separate the cobaltous salt from the hydrocarbon layer this can be done by subjecting the latter to distillation conditions to separate the hydrocarbon therefrom. In cases wherein a hydrocarbon is not employed and the desired cobaltous salt is precipitated out of solution in the aqueous phase, the cobaltous salt, which is in the form of a highly viscous, non-crystalline material, can be separated therefrom by filtration, decantation or any other suitable manner.

The drawing is a graph showing the variation in percentage distribution of cobalt between aqueous and organic phases with pH.

The process of this invention can be illustrated by the following. An aqueous solution similar to that obtained as a result of subjecting a hydroformylation reaction product, obtained from the first stage of the Oxo process and containing dissolved cobalt carbonyl, to a temperature of about 116–138° C. with an aqueous solution containing one to three percent by weight of glacial acetic acid, was prepared by dissolving three grams of cobaltous acetate and three grams of glacial acetic acid in 94 grams of water. This resulted in an aqueous solution containing three percent by weight of cobalt and three percent by weight of acetic acid having a pH of 4.2. There was then added to the solution nine grams of the aqueous sodium salt of 2-ethylhexanoic acid, which amounted to 10 percent by weight in excess of that required for reaction with the cobaltous acetate dissolved in the aqueous solution, and 28 grams of tripropylene. During the addition the entire mixture was vigorously stirred for 30 minutes. The aqueous layer and the hydrocarbon layers were permitted to separate and each layer was then analyzed for its cobalt content. Cobalt in the aqueous layer was present as cobaltous acetate, in the olefin layer as the cobalt salt of 2-ethylhexanoic acid. These runs were repeated, except that sufficient sodium hydroxide was also added to obtain higher pH values. These runs are summarized below in Table I.

TABLE I

| Run No. | Sodium Salt of 2-ethyl-hexanoic Acid Added, Gms. of a 25 Percent by Weight Aqueous Solution | Sodium Hydroxide Added, Gms. of a 10 percent by Weight Aqueous Solution | pH | Cobalt Dissolved in Aqueous Phase, Percent of Total Soluble Cobalt in System | Cobalt Dissolved in Olefin Phase, Percent of Total Soluble Cobalt in System |
|---|---|---|---|---|---|
| 1 | None | None | 4.2 | 100 | 0 |
| 2 | 23.4 | 4.0 | 5.2 | 98 | 2 |
| 3 | 23.4 | 4.8 | 5.4 | 97 | 3 |
| 4 | 23.4 | 6.5 | 5.8 | 80 | 20 |
| 5 | 23.4 | 9.5 | 6.2 | 63 | 37 |
| 6 | 23.4 | 11.8 | 6.6 | 51 | 49 |
| 7 | 23.4 | 15.4 | 7.0 | 43 | 57 |
| 8 | 23.4 | 17.5 | 7.4 | 33 | 67 |
| 9 | 23.4 | 21.2 | 7.8 | 33 | 67 |

The data obtained above are plotted in the accompanying graph. At a pH of 7.4 small amounts of cobaltous hydroxide started to precipitate immediately out of solution. Above a pH of 7.8 nearly all of the cobalt precipitated out of solution immediately, and in fact at a pH of 8.4 only 3.4 percent by weight of all the cobalt in the system was present in dissolved form in the aqueous and organic phases.

Obviously many modifications and variations of the invention, as hereinabove set forth, can be made without departing from the spiirt and scope thereof, and therefore only such limitations should be imposed as are indicated in the appended claims.

We claim:

1. A process for converting a cobalt compound selected from the group consisting of cobaltous acetate and cobaltous propionate to a cobaltous salt selected from the group consisting of the cobaltous salt of 2-ethylhexanoic acid and the cobaltous salt of naphthenic acids which consists in the steps of reacting a cobalt compound selected from the group consisting of cobaltous acetate and cobaltous propionate with a salt selected from the group consisting of the alkali metal salt of 2-ethylhexanoic acid and the alkali metal salt of naphthenic acids in an aqueous solution while maintaining the pH of said aqueous solution throughout the reaction period within in a range of about 6.5 to about 7.5 and simultaneously taking up, while vigorously stirring, the cobaltous salts so formed in a liquid hydrocarbon.

2. A process for converting a cobalt compound selected from the group consisting of cobaltous acetate and cobaltous propionate to the cobaltous salt of 2-ethylhexanoic acid which consists in the steps of reacting a cobaltous compound selected from the group consisting of cobaltous acetate and cobaltous propionate with an alkali metal salt of 2-ethylhexanoic acid in an aqueous solution while maintaining the pH of said aqueous solution throughout the reaction period within a range of about 6.5 to about 7.5 and simultaneously taking up, while vigorously stirring, the cobaltous salts so formed in a liquid hydrocarbon.

3. A process for converting cobaltous acetate to the cobaltous salt of 2-ethylhexanoic acid which consists in the steps of reacting cobaltous acetate with the sodium salt of 2-ethylhexanoic acid in an aqueous solution while maintaining the pH of said aqueous solution throughout the reaction period within a range of about 6.5 to about 7.5 and simultaneously taking up, while vigorously stirring, the cobaltous salt so formed in a liquid hydrocarbon.

4. A process for converting a cobalt compound selected from the group consisting of cobaltous acetate and cobaltous propionate to a cobaltous salt selected from the group consisting of a cobaltous salt of 2-ethylhexanoic acid and the cobaltous salt of naphthenic acids which consists in the steps of reacting a cobalt compound selected from the group consisting of cobaltous acetate and cobaltous propionate with a salt selected from the group consisting of the alkali metal salt of 2-ethylhexanoic acid and the alkali metal salt of naphthenic acids in an aqueous solution while maintaining the pH of said aqueous solution through the reaction period within a range of about 6.5 to about 7.5 and simultaneously taking up, while vigorously stirring, the cobaltous salts so formed in a liquid olefin.

5. A process for converting a cobalt compound selected from the group consisting of cobaltous acetate and cobaltous propionate to the cobaltous salt of 2-ethylhexanoic acid which consists in the steps of reacting a cobaltous compound selected from the group consisting of cobaltous acetate and cobaltous propionate with an alkali metal salt of 2-ethylhexanoic acid in an aqueous solution while maintaining the pH of said aqueous solution throughout the reaction period within a range of about 6.5 to about 7.5 and simultaneously taking up, while vigorously stirring, the cobaltous salts so formed in a liquid olefin.

6. A process for converting cobaltous acetate to the cobaltous salt of 2-ethylhexanoic acid which consists in the steps of reacting cobaltous acetate with the sodium salt of 2-ethylhexanoic acid in an aqueous solution while maintaining the pH of said aqueous solution throughout the reaction period within a range of about 6.5 to about 7.5 and simultaneously taking up, while vigorously stirring, the cobaltous salt so formed in a liquid olefin.

7. A process for converting a cobalt compound selected from the group consisting of cobaltous acetate and cobaltous propionate to a cobaltous salt selected from the group consisting of the cobaltous salt of 2-ethylhexanoic acid and the cobaltous salt of naphthenic acids which consists in the steps of reacting a cobalt compound selected from the group consisting of cobaltous acetate and cobaltous propionate with a salt selected from the group consisting of the alkali metal salt of 2-ethylhexanoic acid and the alkali metal salt of naphthenic acids in an aqueous solution while maintaining the pH of said aqueous solution throughout the reaction period within a range of about 6.5 to about 7.5 and simultaneously taking up, while vigorous stirring, the cobaltous salts so formed in tripropylene.

8. A process for converting a cobalt compound selected from the group consisting of cobaltous acetate and cobaltous propionate to the cobaltous salt of 2-ethylhexanoic acid which consists in the steps of reacting a cobaltous compound selected from the group consisting of cobaltous acetate and cobaltous propionate with an alkali metal salt of 2-ethylhexanoic acid in an aqueous solution while maintaining the pH of said aqueous solution throughout the reaction period within a range of about 6.5 to about 7.5 and simultaneously taking up, while vigorously stirring, the cobaltous salts so formed in tripropylene.

9. A process for converting cobaltous acetate to the cobaltous salt of 2-ethylhexanoic acid which consists in the steps of reacting cobaltous acetate with the sodium salt of 2-ethylhexanoic acid in an aqueous solution while maintaining the pH of said aqueous solution throughout the reaction period within a range of about 6.5 to about 7.5 and simultaneously taking up, while vigorously stirring, the cobaltous salt so formed in tripropylene.

References Cited
UNITED STATES PATENTS

| | | | |
|---|---|---|---|
| 2,751,403 | 6/1956 | Mertzweiler | 260—439 |
| 2,822,409 | 2/1958 | Gwynn et al. | 260—604 |

TOBIAS E. LEVOW, *Primary Examiner.*

HELEN M. McCARTHY, E. C. BARTLETT, A. P. DEMERS, *Assistant Examiners.*